(12) United States Patent
Marino

(10) Patent No.: US 7,678,402 B1
(45) Date of Patent: Mar. 16, 2010

(54) ANIMAL CHEW

(76) Inventor: Joseph A. Marino, 4 Fisher Ct., Lebanon, NJ (US) 08833

( * ) Notice: Subject to any disclaimer, the term of this patent is extended or adjusted under 35 U.S.C. 154(b) by 246 days.

(21) Appl. No.: 11/807,579

(22) Filed: May 29, 2007

(51) Int. Cl.
*A23L 1/137* (2006.01)
(52) U.S. Cl. .................. 426/518; 426/805; 426/473; 426/76; 119/709; 119/710
(58) Field of Classification Search .............. 426/518, 426/635, 805, 473, 132, 641, 76; 119/709, 119/710
See application file for complete search history.

(56) References Cited

U.S. PATENT DOCUMENTS 5,069,914 A * 12/1991 Gagliardi, Jr. ............... 426/76

2003/0106500 A1 * 6/2003 Kirch ........................ 119/710
2004/0228958 A1 * 11/2004 Jia et al. ..................... 426/645

* cited by examiner

*Primary Examiner*—Drew E Becker
*Assistant Examiner*—Preston Smith
(74) *Attorney, Agent, or Firm*—Joseph E. Funk

(57) ABSTRACT

A novel dog chew is disclosed made of raw hide which has a large plurality of closely spaced perforations cut there through during manufacture of the dog chew. Typically the perforations are created in first rows that are generally parallel to each other and in second rows that are also generally parallel to each other, and the first rows intersect the second rows to create a cross hatching pattern. The intersecting sets of perforations created by the cross hatch pattern define a large number of small sections on the rawhide. The small sections of the dog chew individually break off when chewed by a dog instead of large pieces that may choke the dog.

12 Claims, 5 Drawing Sheets

ANIMAL CHEW

FIELD OF THE INVENTION

The present invention relates to products that are chewed and eaten by animals, such as dogs, and are made of animal skin or a synthetic material.

BACKGROUND OF THE INVENTION

A product made for dogs generally called "chews" are given to dogs for a variety of reasons. Chews are used to occupy a dog and to help clean its teeth.

Chews can be made from a variety of materials. For example, they are often made of processed, dried animal skin, such as rawhide (untanned) cattle skin, buffalo skin or pigskin. The skin is processed by removing hair and cleaning it. The skin can also be treated to soften it, if desired. The skin is then formed into a desired final shape for distribution, such as by folding or rolling if necessary, and then dried. In the shaping process smaller filler pieces may be added. The final product may be a flat chip, a roll, or look like a bone.

In the prior art, dog chews are made of materials other than rawhide. For example, the chews can be made of man made shoe fiber, other man made composite materials and cellulose.

In the chewing process a dog may chew off pieces that are too large and they sometimes attempt to swallow the pieces. The dog will choke on the larger pieces.

Thus, there is a need in the prior art for a dog chew that inhibits pieces being chewed off that are too large and cause a dog to choke when they attempt to swallow the pieces.

SUMMARY OF THE INVENTION

The need in the prior art for an improved dog chew is satisfied by the present invention. The base material from which the dog chew is made has a large number of relatively closely spaced perforations cut through it. These perforations are formed through the base material, usually a sheet of rawhide from which the dog chew is made, prior to the material being rolled or otherwise formed into the final shape of a dog chew. The perforations are created in a plurality of first rows that are generally parallel to each other and in a plurality of second rows that are also generally parallel to each other, and the first rows intersect the second rows to create a cross hatching. The plurality of first and second rows may be perpendicular to each other. The perforations create a large plurality of small rawhide sections that will individually break off in lieu of large pieces that may choke a dog.

While animal skins may be utilized to make a dog chew, many other materials may also be utilized. Any chewable base material that is safe for a dog to chew may be utilized. Such other materials include man made shoe fiber, cellulose, and other man made composite materials.

The rawhide is first soaked and treated, then the perforations are cut through the base material used to make a dog chew, and finally the perforated raw hide is rolled or otherwise formed into its final shape. Such final shapes are typically a bone, a rod or a flat piece called a "chip". When the dog chew is a bone shape the rawhide forming the middle area between bulbous ends of the bone may or may not be perforated. Not perforating the middle area help prevent the bulbous ends from breaking off.

The large plurality of small sections that are created by the intersecting pattern of perforations facilitate the small pieces defined by the small sections breaking off into small pieces when the rawhide product is chewed by a dog. In addition, the pieces that break off are small enough as not to choke the dog when the pieces are swallowed.

The design of the smaller sections created by the perforations can vary in shape or size. The size of the perforations and the distance between the perforations in any direction can be varied depending on how easily it is desired to make the sections break off rawhide when it is chewed, and to set the size of the pieces that break off.

The perforations are each elongated penetrate through the sheet base material from which dog chews are formed. The perforations are preferably one-quarter inch long and spaced one-quarter inch apart in any direction. The perforations through the base material are created using a special tool. The tool may be in the form of a flat bed press having a large plurality of small blades that form the cross hatching perforation pattern, or the tool may be a pair of rollers on which is a plurality of small cutter blades for forming the cross hatching perforation pattern when the base material is passed between the rollers. Other techniques may also be utilized to create the perforations.

DESCRIPTION OF THE DRAWINGS

The invention will be better understood upon reading the following Detailed Description in conjunction with the drawings in which.

DETAILED DESCRIPTION

The need in the prior art for an improved dog chew is satisfied by the present invention. The base material from which the dog chew is made has a large number of closely spaced perforations. These perforations are typically cut through the base material, which is preferably a sheet of raw hide, after the raw hide is soaked and treated to enhance flexibility etcetera. The base material is then formed into the final shape of the dog chew and is dried. The perforations are created in first rows that are generally parallel to each other and in second rows that are generally parallel to each other, and the first rows of perforations intersect the second rows of perforations to create a cross hatching. The cross hatching creates a large plurality of small sections that make it easy for small pieces to break off rather than large pieces when a dog gnaws on the dog chew.

As briefly mentioned in the Summary of Invention many types of base materials can be perforated prior to being shaped into a dog chew. The base material is preferably an animal skin from any animal (rawhide), but it may be man made shoe fiber, cellulose, and other man made composite materials. In the following description only the term rawhide is used for the sake of simplicity and because it is the preferred material from which to make dog chews according to the teaching of the present invention.

Very briefly, as mentioned hereinabove, rawhide (untanned cattle skin, buffalo skin or pig skin) is preferably used to make a dog chew in accordance with the teaching of the present invention. The animal skin is first processed to remove hair and to clean it. The rawhide may then be treated to soften it somewhat. Next the rawhide is perforated in accordance with the teaching of the invention. Finally, the perforated rawhide is formed into the desired final shape, such as by folding or rolling, and it is dried. The cleaning and treatment of the rawhide is well known in the art and is not described herein. In addition, in the following description of the Figures the treatment of the rawhide is mentioned very little in order not to detract from the description of the invention.

Figure 1:
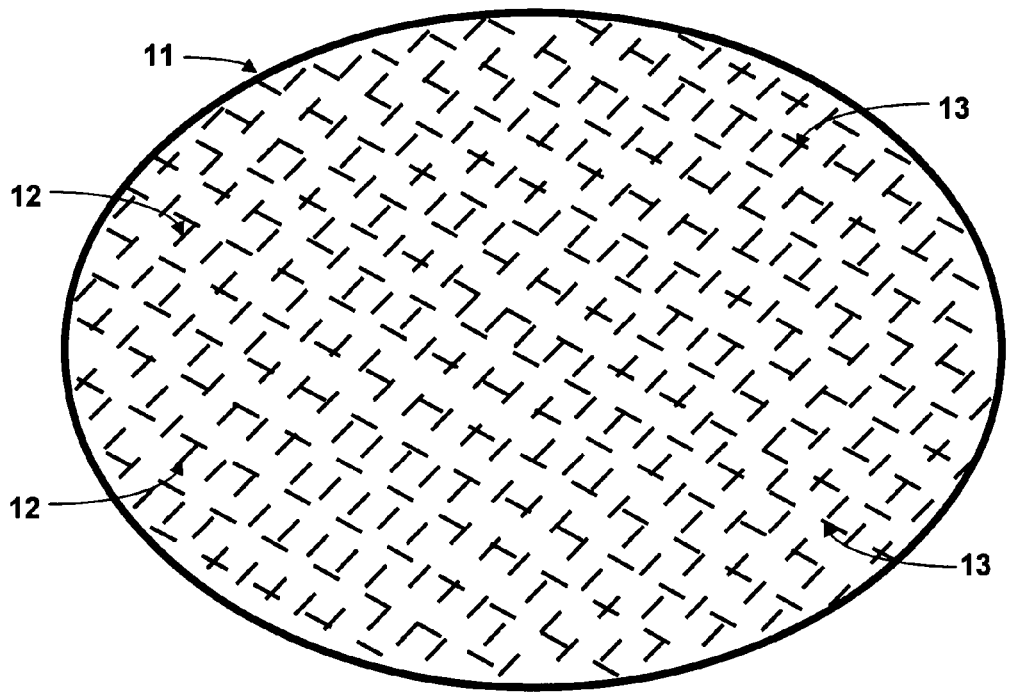
FIG. 1 shows a piece of material with a large plurality of perforations there through that are somewhat randomly located.

In FIG. 1 is shown an oval piece of rawhide 11 that has had a plurality of perforations 12, 13 cut there through. The shape of raw hide 11 need not be oval and this shape is used only for simplicity of presentation. Perforations 12 are formed in a direction that is different than perforations 13 and preferably are approximately perpendicular to each other, as shown. Each perforation 12 or 13 is a linear slit through the rawhide, and slits 12 and 13 are shown in rows that are not parallel to each other. However, the slits 12 and 13 need not be linear and they need not be in rows as shown. In FIG. 1 the perforations 12 and 13 have been cut at different times in a two step process and the pattern of the cuts will typically be somewhat random as shown in FIG. 1. In addition, perforations 12 and 13 in FIG. 1 may not be as close to perpendicular to each other as is preferred. Perforations 12 and 13 have been cut using a simple, two pass, flat bed cutter that is shown in and described hereinafter with reference to FIG. 8.

Figure 2:
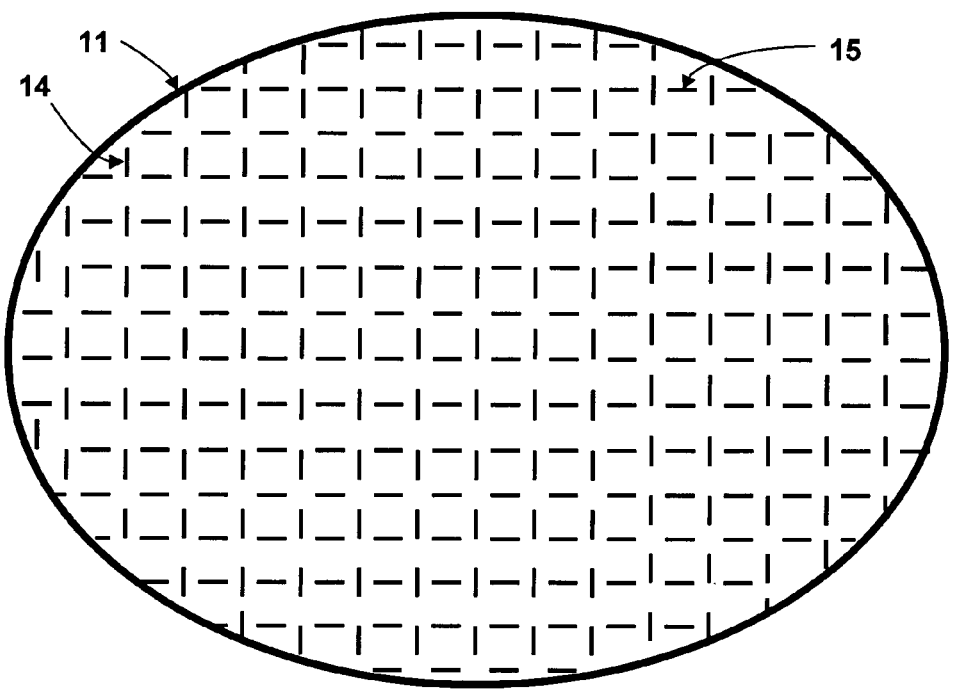
FIG. 2 shows a piece of material with a large plurality of perforations there through that are exactly located in rows and columns.
Figure 9:
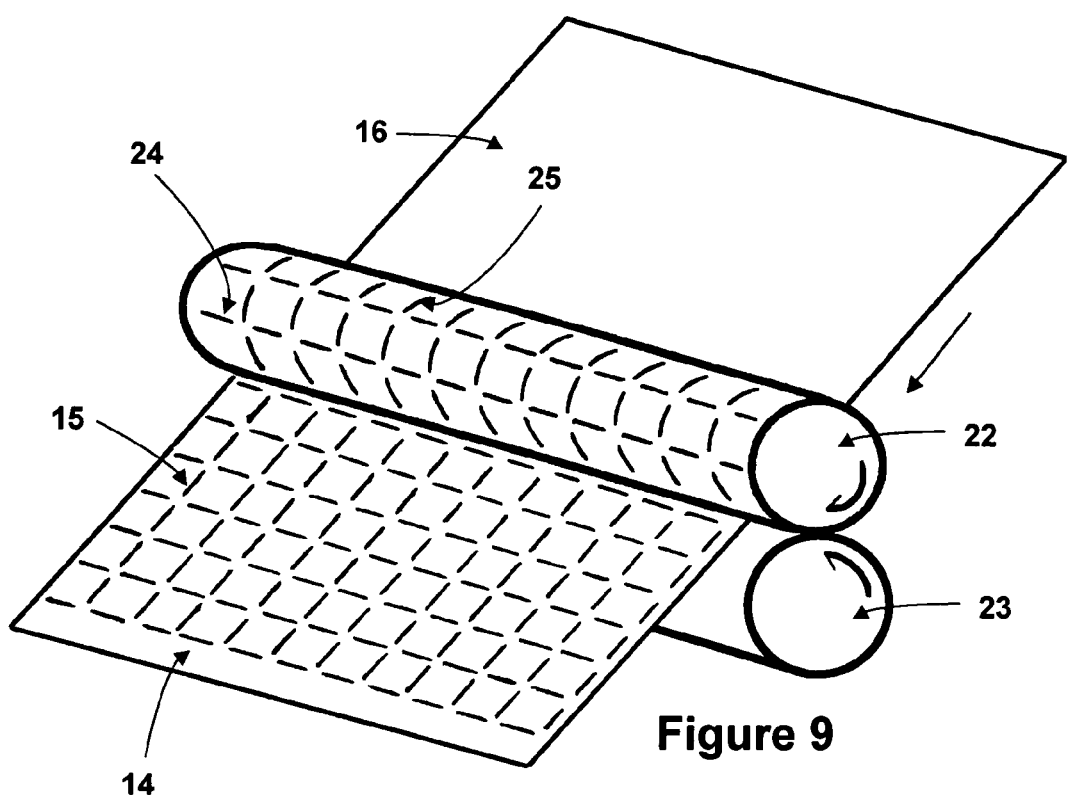
FIG. 9 shows a roller arrangement having small cutting blades thereon for perforating a sheet of material in two directions as the material passes between the rollers.

In FIG. 2 is also shown another oval piece of rawhide 11 that has had a plurality of perforations 12, 13 cut there through. However, these perforations are very orderly in size, spacing and orientation. These perforations 12 and 13 have been concurrently cut using a rotary cutter that is shown in and described hereinafter with reference to FIG. 9. As also described hereinafter the orderly perforations may also be cut using a modified flatbed cutter.

After perforations are cut through a piece of rawhide 11, such as shown in FIGS. 1 and 2, the raw hide is typically cut into a final shape before being formed into a dog chew and dried. One example of such a final shape is the rectangle piece shown in FIG. 3. The rectangular piece of perforated rawhide 61 shown in FIG. 3 may be formed into a final shape such as the dog chew roll shown in FIG. 4.

Figure 3:
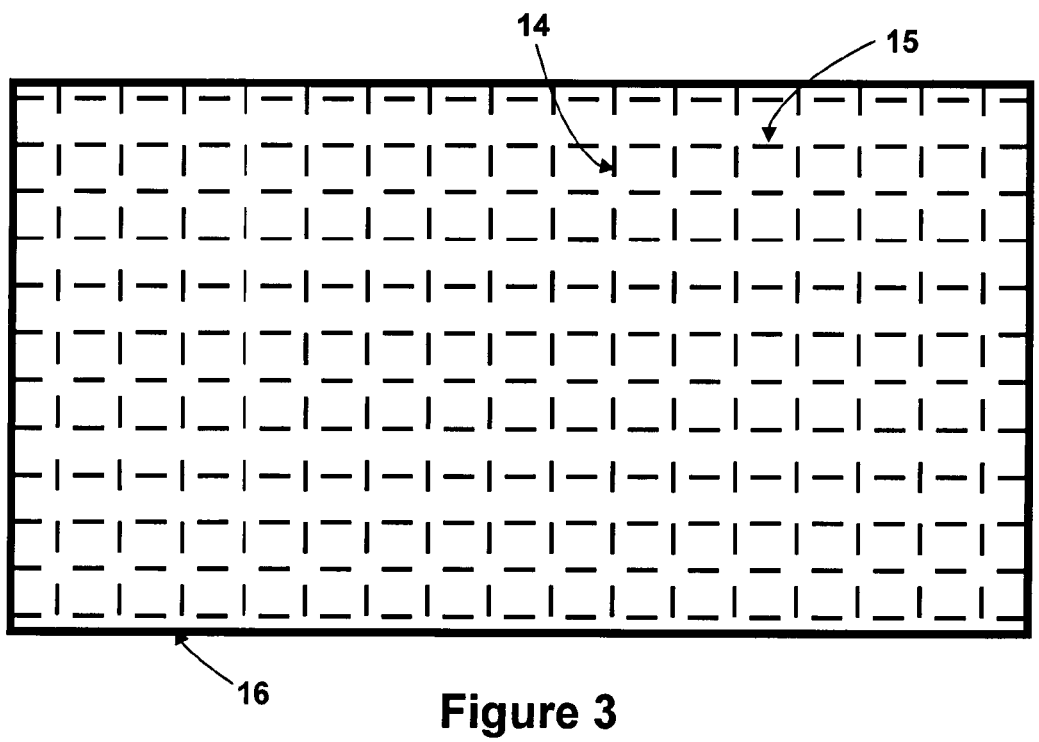
FIG. 3 shows a piece of perforated material that has been cut to a final shape with a large plurality of perforations there through that are exactly located in rows and columns.
Figure 4:
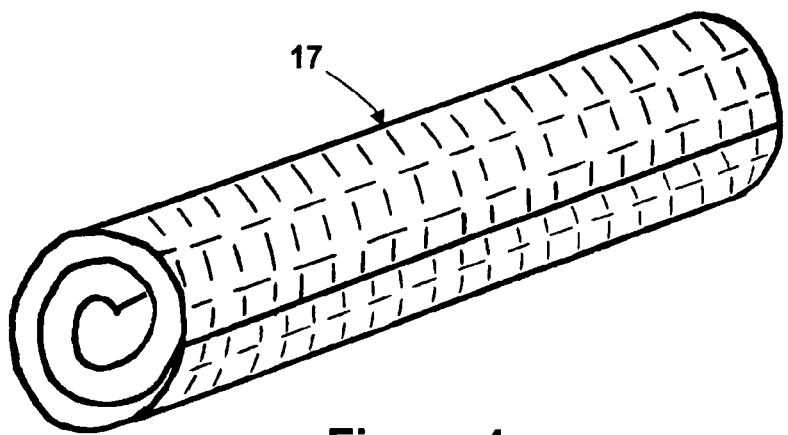
FIG. 4 shows the perforated material of FIG. 3 rolled into a chew rod.

In FIG. 4 is shown a dog chew 17 that has been formed into the shape of a roll starting with a rectangular piece of perforated rawhide 16 such as shown in FIG. 3. The treatment of the rawhide, cutting of perforations, and cutting of pieces from a larger rawhide piece 11 are described elsewhere herein. The main difference is the finally shaping of the perforated rawhide 16 into the chew roll 17. The shaping is done in a manner known in the art so is not described herein.

Figure 5:
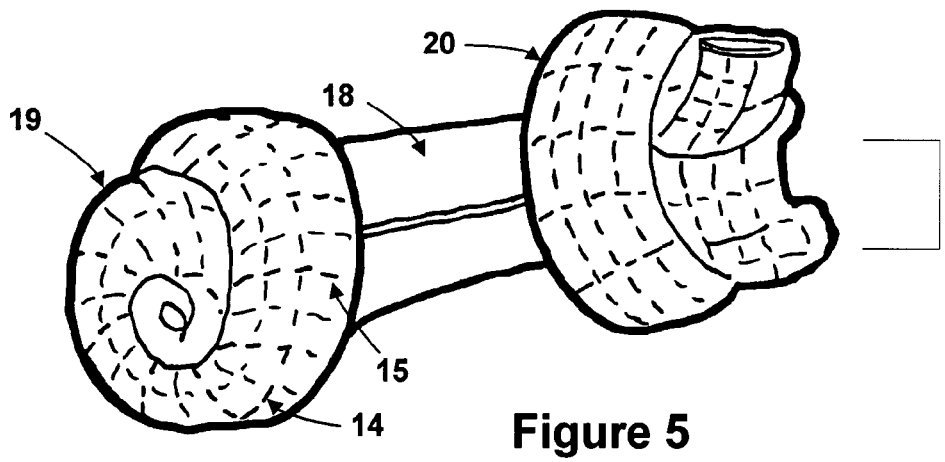
FIG. 5 shows a perforated material formed into a bone shaped chew where the middle area of the bone chew is not perforated.

In FIG. 5 is shown a dog chew that has been formed into the shape of a bone. The shaping is done in a manner known in the art so is not described herein. The treatment of the rawhide, cutting of perforations, and cutting of pieces from a larger rawhide 11 are as described elsewhere herein. The main difference is that no perforations are cut in the rawhide in the middle area 18 of the bone chew. This helps prevent bulbous ends 19 and 20 of the bone chew from breaking off from middle area 18 as the bone chew is being gnawed by a dog, and particularly by a larger dog.

Figure 6:
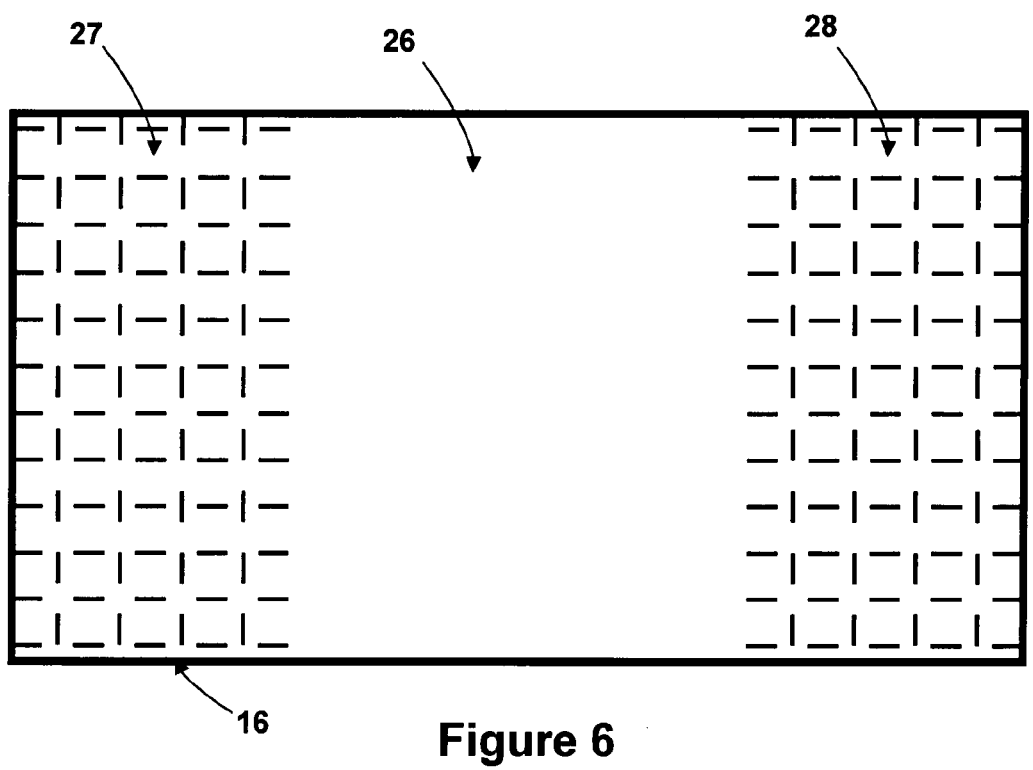
FIG. 6 shows how a flat piece of material is perforated before being shaped into a bone shaped chew where the middle area of the bone chew is not perforated.

In FIG. 6 is shown how a flat piece of rawhide 16 is perforated before being shaped into the bone shaped chew shown in FIG. 5. A flat piece of already treated rawhide 16 has only its end areas 27 and 28 perforated and its middle area 26 is not perforated. Area 27 corresponds to end 19 of the bone chew in FIG. 5, area 28 corresponds to end 20 of the bone chew, and middle area 26 corresponds to the middle section 18 of the bone chew. By not having perforations in the middle area 27 of rawhide 16 the structural integrity of the middle section 18 of the bone chew is increased.

Rawhide 16 shown in FIG. 6 is not drawn to scale and is meant to be representative only. The size of perforated areas 27 and 28 will typically be larger to provide sufficient material for the bulbous ends 19 and 20 to be formed for the bone shaped dog chew shown in FIG. 5. In addition, some rawhide filler pieces may be rolled inside the perforated rawhide 16 in FIG. 6 as it is rolled and shaped into the bone chew shown in FIG. 5.

Figure 7:
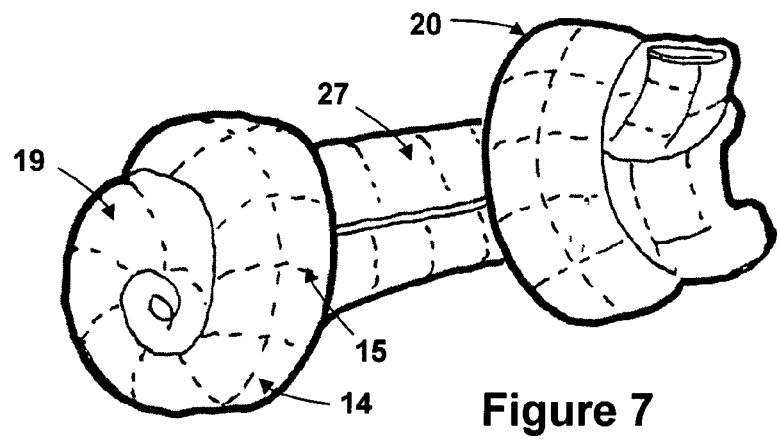
FIG. 7 shows a variation of the bone shaped chew where the middle area of the bone chew is perforated and is made from a piece of material such as shown in FIG. 3.

In FIG. 7 is shown a variant of the bone shaped dog chew shown in FIG. 5 except the perforations are also cut into the rawhide material that forms the middle portion 27. In such a case a piece of fully perforated rawhide, such as shown in FIG. 3, is utilized to form the bone shaped dog chew.

Figure 8:
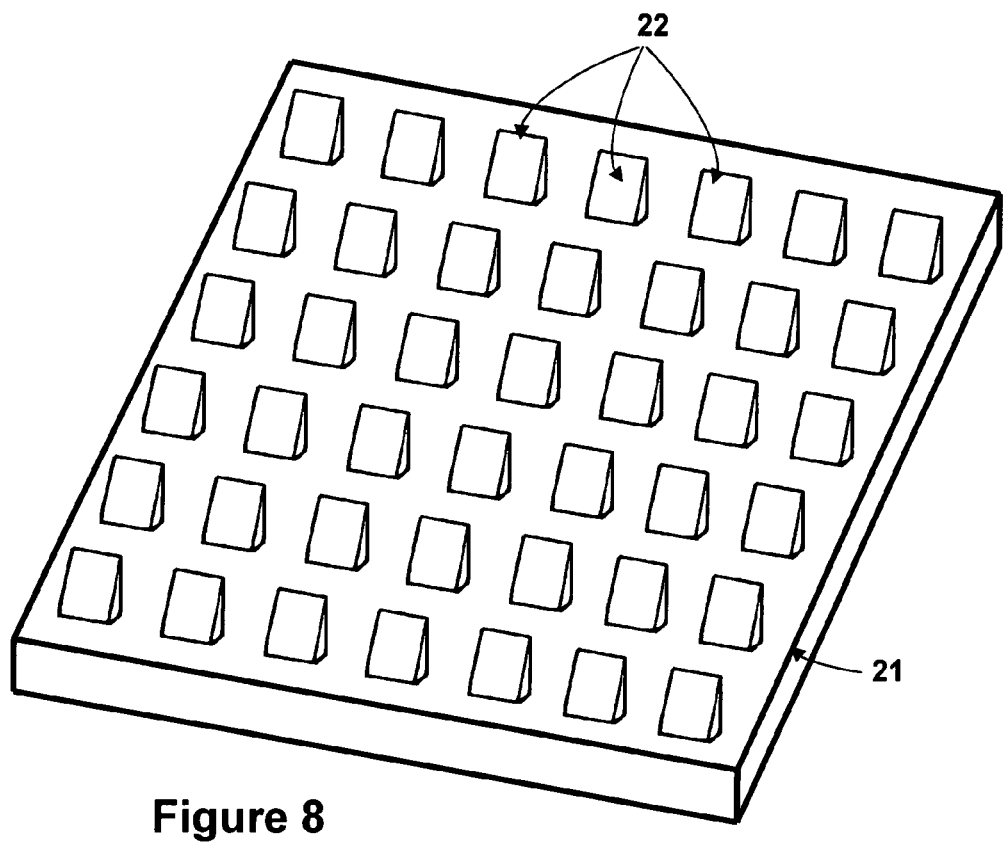
FIG. 8 shows a flat array of small cutting blades used to perforate a material in one direction.

When a piece of rawhide 11 is processed to cut perforations there through the perforations may be cut in different ways. The piece of rawhide 11 may be processed with a cutting tool 21, such as shown in FIG. 8, to cut the perforations. Cutting tool 21 is an example of a simple flat bed cutter that requires two passes of a piece of rawhide there through to cut the perpendicular sets of perforations. The perforations are cut by placing a piece of rawhide on top of tool 21 and applying pressure to the rawhide with a flat plate (not shown) that is positioned on top of the rawhide. The pressure forces the rawhide against the chisel edge cutters 22 which then cut through the rawhide creating the perforations. For example, with the first cut perforations 12 are cut. The rawhide is then rotated close to or at ninety degrees and is reprocessed in the same manner to cut perforation 13 through the rawhide using the same cutting tool 21. When perforations 12 and 13 are cut at different times the pattern of the cuts will typically be somewhat random as shown in FIG. 1. In addition, perforations 12 ands 13 in FIG. 1 may not be as closely to perpendicular to each other as is shown in FIG. 1.

Cutting tool 21 in FIG. 8 is only a simple example of a flat bed cutter that can be used to cut perforations in a piece of raw hide 11. On cutting tool 21 are shown six rows each having seven chisel edge cutters 22. In reality there would be many more cutters 22 and only a small number of cutters are shown in FIG. 8 to understand the invention with reference to a flat bed cutter. Since the simple cutting tool 21 shown in FIG. 8 can cut rows of linear perforations in only one direction at a time, after cutting perforations (such as 12) on a piece of raw hide 11 in one orientation, the piece of raw hide 11 must be rotated approximately ninety-degrees and a second set of perforations (such as 13) is cut through the piece of raw hide 11. Being as it would be difficult to perfectly orient the second set of perforations with respect to the first set of perforations the result will be as shown in FIG. 1. The two sets of perforations are not as neatly oriented with respect to each other as shown in FIG. 2.

Although not shown in the Figures, a flat bed cutter may be fabricated that has two sets of cutting blades set perpendicular to each other to concurrently cut neat sets of perforations 12 and 13 such as shown in FIGS. 2 and 3. When perforations 12 and 13 are cut through rawhide piece 11 at the same time the perforations can be cut exactly perpendicular to each other and be perfectly spaced from each other as shown in FIGS. 2 and 3. As shown in FIG. 2 linear perforations 12 are each one-quarter inch long and they are spaced one-quarter inch from each other. The rows of linear perforations 12 are spaced one-quarter inch from an adjacent row of perforations 12. The same applies to perforations 13. In addition, perforations 12 and perforations 13 are specifically oriented perpendicular to each other as shown in FIG. 2. This size and spacing of perforations 12 and 13 is used to control the size of individual sections, which are small squares in FIG. 2 bounded by pairs of perforations 12 and 13. These dimensions help control how easily the individual sections will break from each other when a finished dog chew, such as shown in FIGS. 4, 5 and 6, is chewed by a dog.

The dimension of one-quarter inch used in the previous paragraph is not critical and may be changed. In addition, the perforations 12 and 13 may be of one length while the spacing between them lengthwise may be a different dimension, the lengths of perforations 12 and 13 may be of different from each other, the spacing between parallel rows of perforations may be different, the physical orientation of perforations 12 to perforations 13 may be different than as shown in FIG. 2, and the perforations need not be linear, etcetera. In addition, sets of perforations 12 and 13 need not be perpendicular to each other.

The design of the smaller sections bounded by perforations 12 and 13 can vary in shape or size. They may be square as shown in FIG. 2, rectangular, diamond, round oval or any other shape. The size of the perforations and the distance between the perforations in any direction can be varied depending on how easily it is desired to make the sections break off when the hide is chewed, and to set the size of the pieces that will break off. In addition, the dimensions may be changed depending upon the physical characteristics of the rawhide, such as thickness and hardness, which is being perforated and made into a dog chew. Further, the dimensions and shapes may be changed depending upon the type of dog chew being made, and the size of dog for which the dog chew is being made. A large dog can gnaw on a dog chew with larger sections and with sections that do not break off as easily as would be needed for a small dog.

Perforations 12 and 13 may also be cut through rawhide 11 in a manner different than using the flat bed cutter 21 shown in FIG. 8. Such an alternative method is a roll or drum type cutter shown in FIG. 9, and such an alternative method is actually preferred. The drum cutter comprises rollers 22 and 23. Roller 22 has sets of cutter blades 24 and 25 protruding perpendicular from its surface. Cutter blades 24 cut perforations 14 through rawhide 11 and cutter blades 25 cut perforations 15 through rawhide 11. As rollers 22 and 23 rotate, as depicted by the arctuate arrows on the end of the two rollers, rawhide 11 is drawn between the rollers as depicted by the linear arrow to the right side of the rawhide and perforations 14 and 15 are cut through rawhide 11 as shown. Due to the fact that the cutter blades 24 and 25 are mounted together on roller 22 the perforations will be cut through rawhide 11 in the exacting and repeatable pattern shown in FIGS. 2 and 3. On roller 22 are shown only a few rows each having eleven chisel edge cutters 25. In reality there would be many more cutters 24 and 25 and the diameter of the rollers 22 and 23 would be larger.

In an alternate embodiment of the roll or drum type cutter, not shown in the Figures, cutter blades 24 may be protruding from the surface of roller 22 and cutter blades 25 may be protruding from the surface of roller 23.

While what has been described hereinabove is a preferred embodiment of the invention and some alternative embodiments thereof, those skilled in the art will understand that numerous changes may be made without departing from the spirit and scope of the invention.

The invention claimed is:

1. A method of processing a sheet of an animal rawhide to make an animal chew product, the sheet of rawhide being divided into a first, a second and a third adjacent strips with the first strip being contiguous to a first edge of the rawhide, the third strip being contiguous to a second edge of the sheet of rawhide, and the first and the third edges of the rawhide being opposite edges of the sheet of rawhide, and the second strip being between the first and third strips and defining a middle area between the two opposite edges of the sheet of rawhide, the method for making the animal chew product comprising the steps of:

cutting a first plurality of perforations through the rawhide in a first direction in the first strip adjacent to the first edge and in the third strip adjacent to the second edge, but there being no first direction perforations through the sheet of rawhide in the second strip which defines the middle area of the sheet of rawhide between the two opposite edges;

cutting a second plurality of perforations through the rawhide in a second direction that is not parallel to the first direction, the second plurality of perforations being in the first strip adjacent to the first edge and in the third strip adjacent to the second edge, but there being no second direction perforations through the sheet of rawhide in the second strip which defines the middle area of the sheet of rawhide between the two opposite edges; and forming the sheet of rawhide into the shape of the animal chew product by rolling the rawhide so that the middle area with no perforations is in the middle of the rolled sheet of rawhide, the sheet of rawhide being formed by rolling the sheet of rawhide so that the first, second and third strips of the sheet of rawhide are each rolled onto themselves and the rolled first strip defines a first end of the rolled sheet of rawhide, the rolled third strip defines a second end of the rolled sheet of rawhide, and the rolled second strip defines the middle area of the rolled sheet of rawhide and there are no perforations in the middle area of the rolled sheet of rawhide, wherein the first plurality of perforations and the second plurality of perforations in each of the first and third strips of the rolled sheet of rawhide cooperate to control the size of pieces that break off the first end and the second end of the rolled sheet of rawhide at the perforations as an animal gnaws on the animal chew product.

2. The method for processing a sheet of animal rawhide in accordance with claim 1 further comprising the step of drying the rawhide after the step of forming the sheet of rawhide.

3. The method for processing a sheet of an animal rawhide to make an animal chew product in accordance with claim 1 wherein:

the second plurality of perforations through the sheet of rawhide are generally perpendicular to the first plurality of perforations through the material.

4. The method for processing a sheet of animal rawhide to make an animal chew product in accordance with claim 2 wherein:

the first plurality of perforations through the sheet of rawhide are generally parallel rows of first linear spaced cuts, and all such first linear cuts are aligned in the first direction; and the second plurality of perforations through the sheet of rawhide are generally parallel rows of second spaced linear cuts, and all such second linear cuts are aligned in the second direction, where the second direction is not parallel to the first direction.

5. The method for processing a sheet of an animal rawhide to make an animal chew product in accordance with claim 4 further comprising the step of:

treating the sheet of animal rawhide to make it more acceptable to the animal that will be gnawing on the animal rawhide, preferably before the step of forming the sheet of animal rawhide into the shape of the animal chew product.

6. The method for processing a sheet of an animal rawhide to make an animal chew product in accordance with claim 1 wherein the lack of perforations in the middle of the rolled sheet of rawhide increases the structural integrity of the rawhide in the middle area.

7. The method for processing a sheet of an animal rawhide to make an animal chew product in accordance with claim 1 wherein after the sheet of rawhide is rolled during the step of forming, the ends thereof are formed into a half knot to create bulbous ends on the animal chew product.

8. The method for processing a sheet of an animal rawhide to make an animal chew product in accordance with claim 7 further comprising the step of drying the animal rawhide after the step of forming the sheet of animal rawhide.

9. The method for processing a sheet of an animal rawhide to make an animal chew product in accordance with claim 1 further comprising the step of:

treating the sheet of animal rawhide to make it more acceptable to the animal that will be gnawing on the animal chew product, preferably before the step of forming the sheet of animal rawhide into the shape of the animal chew product.

10. The method for processing a sheet of an animal rawhide to make an animal chew product in accordance with claim 9 wherein after the sheet of animal rawhide is rolled during the step of forming, the ends thereof are formed into a half knot to create bulbous ends on the animal chew product.

11. The method for processing a sheet of an animal rawhide to make an animal chew product in accordance with claim 9 further comprising the step of drying the formed animal rawhide after the step of forming the sheet of animal rawhide.

12. The method for processing a sheet of an animal rawhide to make an animal chew product in accordance with claim 11 wherein the lack of perforations in the middle of the rolled sheet of animal rawhide increases the structural integrity of the animal chew product in the middle area.

* * * * *